United States Patent [19]

Jenner et al.

[11] Patent Number: 5,061,399
[45] Date of Patent: Oct. 29, 1991

[54] OPTICALLY ACTIVE NAPHTHALENE COMPOUNDS AND LIQUID CRYSTAL MATERIALS AND DEVICES INCORPORATING THEM

[75] Inventors: John A. Jenner; Ian C. Sage; Stephen J. Lewis, all of Poole, England

[73] Assignee: The Secretary of State for Defence in Her Britannic Majesty's Government of the United Kingdom of Great Britain and Northern Ireland, London, England

[21] Appl. No.: 285,963
[22] PCT Filed: Apr. 27, 1987
[86] PCT No.: PCT/GB87/00280
§ 371 Date: Dec. 5, 1988
§ 102(e) Date: Dec. 5, 1988

PCT Pub. Date: Nov. 5, 1987

[30] Foreign Application Priority Data

Apr. 28, 1986 [GB] United Kingdom ............... 8610349

[51] Int. Cl.$^5$ .................. C09K 19/32; C07C 69/76
[52] U.S. Cl. .................. 252/299.62; 252/299.01; 252/299.6; 560/56; 560/100; 359/104
[58] Field of Search .................. 252/299.01, 299.62, 252/299.61, 299.6; 350/350 S; 560/56, 100, 139

[56] References Cited

U.S. PATENT DOCUMENTS

| | | | |
|---|---|---|---|
| 4,113,647 | 9/1978 | Coates et al. | 252/299.62 |
| 4,386,007 | 5/1983 | Krause et al. | 252/299.62 |
| 4,542,230 | 9/1985 | Gray et al. | 252/299.65 |
| 4,585,575 | 4/1986 | Sugimori et al. | 252/299.62 |
| 4,610,805 | 9/1986 | Schettenberger et al. | 252/299.62 |
| 4,613,209 | 9/1986 | Goodby et al. | 350/350.5 |
| 4,769,176 | 9/1988 | Bradshaw et al. | 252/299.65 |
| 4,780,241 | 10/1988 | Furukawa et al. | 252/299.63 |
| 4,921,632 | 5/1990 | Nakamura et al. | 252/299.01 |
| 4,943,651 | 7/1990 | Nishiyama et al. | 560/56 |

FOREIGN PATENT DOCUMENTS

| | | | |
|---|---|---|---|
| 0347942 | 12/1989 | European Pat. Off. | 252/299.62 |
| 0350935 | 1/1990 | European Pat. Off. | 252/299.62 |
| 0356672 | 3/1990 | European Pat. Off. | 252/299.62 |
| 3515373 | 11/1986 | Fed. Rep. of Germany . | |
| 62-10045 | 1/1987 | Japan . | |
| 63-17847 | 1/1988 | Japan . | |
| 63-17848 | 1/1988 | Japan . | |
| 63-166850 | 7/1988 | Japan . | |
| 02008292 | 1/1990 | Japan | 252/299.62 |
| 02191240 | 7/1990 | Japan | 252/299.62 |
| 1603075 | 11/1981 | United Kingdom | 252/299.62 |
| 2166754 | 5/1986 | United Kingdom . | |

OTHER PUBLICATIONS

Tinh et al., Mol. Cryst. Liq. Cryst., Letters 4(3-4), pp. 87-92, (Jan. 1987).
Destrade et al., Mol. Cryst Liq. Cryst., 127, pp. 273-282 (1985).
Demus (ed.), Flussige Kristalle in Tabellenr, pp. 234-242 (1976).
Demus (ed.), Flussige Kristalle in Tabellen II, pp. 314-324 (1984).

*Primary Examiner*—John S. Maples
*Assistant Examiner*—Richard Treanor
*Attorney, Agent, or Firm*—Nixon & Vanderhye

[57] ABSTRACT

Optically active naphthalene compounds having the formula:

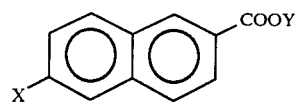

in which X and Y are selected from combinations (a), (b) and (c): (a) X is $C_{1-10}$ alkyl or alkoxy and Y is $C_{4-16}$ optically active alkyl, (b) X is $C_{1-10}$ alkyl or alkoxy and Y is

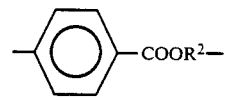

where $R^2$ is $C_{4-16}$ optically active alkyl, (c) X is

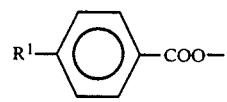

where $R^1$ is $C_{1-10}$ alkyl or alkoxy and Y is $C_{4-16}$ optically active alkyl. Ferroelectric smectic liquid crystal materials being compositions containing these compounds are also described.

[87] PCT Pub. No.: WO87/06577

13 Claims, 3 Drawing Sheets

Route C

OPTICALLY ACTIVE NAPHTHALENE COMPOUNDS AND LIQUID CRYSTAL MATERIALS AND DEVICES INCORPORATING THEM

This invention relates to novel optically active naphthalene derivatives and to liquid crystal materials and devices incorporating them. In particular it relates to such derivatives as are suitable for use in ferroelectric smectic liquid crystal materials and devices.

BACKGROUND OF THE INVENTION

Optically active naphthalene compounds are known for use in liquid crystal materials, for example GB1603075 describes compounds of formula:

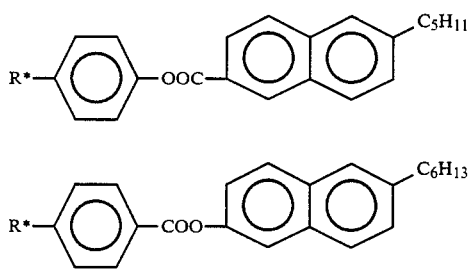

where R* is optically active 2-methylbutyl. Other homologues of these described therein have liquid crystal characteristics, but are described only for use in nematic liquid crystal materials. Mol. Cryst. Liq. Cryst. Letters 4(3-4) p87-92 (January 1987) discloses the use of optically active naphthalene derivatives in ferroelectric smectic liquid crystals, but that publication is later than the priority data hereof.

Ferroelectric smectic liquid crystal materials use the ferroelectric properties of the chiral tilted smetic C, F, G, H, I and K phases (designated $S_C^*$ etc, the asterisk denoting chirality). The $S_C$ phase is generally the most useful, as it is the most fluid, and it is particularly desirable that the material shows an $S_A$ or nematic (denoted N) phase at temperatures above the chiral smectic phase, to assist surface alignment in a liquid crystal device. Ferroelectric smectic liquid crystal materials desirably have low viscosity, $S_C$ phases that persist over a broad temperature range which includes ambient temperature, chemical and photochemical stability, and in particular have a high spontaneous polarisation coefficient, Ps, measured in nC cm$^{-2}$. Such materials offer the possibility of very fast swiched liquid crystal display devices.

Although some single compounds show all of the desirable properties outlined above, ferroelectric smectic liquid crystal materials in use today generally consist of a mixture of two major components, each of which may itself by a single compound or a mixture of compounds, one component being termed a 'host', and the other being termed a 'dopant'.

The host is generally a material that shows a smectic phase (preferably tilted smectic, especially $S_C$) without being chiral. The dopant is or contains at least one optically active compound, without necessarily showing a smectic phase, although it is preferred if the dopant does itself show a smectic phase. The dopan when mixed with the host induces tilted smectic phases shown by the mixture to be chiral.

Preferably the dopant induces the mixture to show a high Ps, together with the other desirable properties mentioned above. Often tough a compromise is achieved, in which although the dopant induces a high Ps in the mixture, other desirable properties are to some extent sacrificed, for example the temperature at which the $S_C^*$ phase disappears may be depressed.

It is an object of the present invention to provide novel dopants for use in ferroelectric smectic liquid crystal mixtures which induce a usefully high Ps in a mixture with a host, and which in part at least overcome the problems encountered by the use of known dopants.

BRIEF DESCRIPTION OF THE DRAWINGS

The invention is further explained with reference to the appended drawings in which.

DETAILED DESCRIPTION OF THE INVENTION

Figure 1:
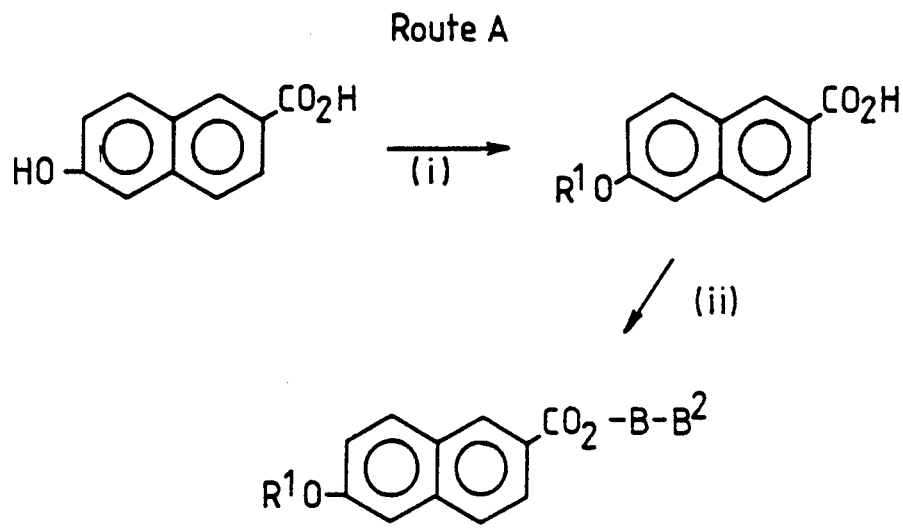
FIGS. 1, 2 and 3 show preparative routes A, B and C, respectively.

According to the present invention an optically active compound is provided having a general formula:

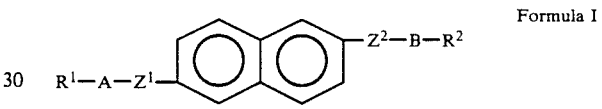

Formula I where $R^1$ and $R^2$ each independently contain 1–16 carbon atoms and are independently selected from alkyl, alkoxy, perfluoroalkyl or perfluoroalkoxy, in which one or more $CH_2$ or $CR_2$ groups may be replaced by O, CO, CH-Halogen, —OOC—, —COO— or CH=CH or from a combination of two such groupings provided that two heteroatoms are not directly linked;

where $Z^1$ and $Z^2$ are independently selected from a single bond, —COO—, —OOC— and —O—;

where A and B are independently selected from (i) a single bond, or (ii) a phenyl, trans-cyclohexyl, pyridyl or pyrimidyl group, wherein the phenyl group may carry lateral halogen substituents or (iii) B may be a chiral group —CH(CH$_3$)COO— where $R^2$ is alkyl; provided that if one of —A—$Z^1$— or —$Z^2$—B— is a phenyl ring linked to the naphthyl system via an OOC or COO group and the other is a single bond, then $R^1$ and $R^2$ are not both selected from alkyl or alkoxy, and also if one of $R^1$—A—$Z^1$— or $Z^2$—B—$R^2$ are alkoxyphenyl-COO— then the other is not COO—CH$_2$CH(CH$_3$)C$_2$H$_5$.

Many compounds of Formula I are suitable for use as chiral dopants in ferroelectric smectic liquid crystal materials and according to a further aspect of the invention a ferroelectric smectic liquid crystal contains at least one compound of Formula I, the material being a mixture of at least two compounds.

Preferably one of $R^1$ and $R^2$ is optically active.

When $R^1$ and/or $R^2$ are alkyl they may contain 1 to 16 carbon atoms especially 6 to 10. $R^1$ and/or $R^2$ may be n-alkyl especially -octyl, or a branched (iso) or optically active (Chiral) alkyl especially 2-methylheptyl. Other suitable optically active alkyl groups include 2-methylbutyl, 3-methylpentyl and 4-methylhexyl.

When $R^1$ and/or $R^2$ are alkyl having a $CH_2$ group replaced by —O— or —COO—, e.g. to form a group —O—R or —COOR where R is alkyl, R preferably contains 6 to 10 carbon atoms and may be n-alkyl especially -octyl, or a branched (iso), or optically active alkyl especially 2-methylheptyl or one of the other optically active alkyl groups referred to above.

When $R^1$ and/or $R^2$ are alkyl having a $CH_2$ group replaced by CH-Halogen and/or —O—, OOC or COO the presence of the halogen may create an assymetric carbon in $R^1$ and/or $R^2$. The halogen is preferably chlorine. The alkyl chain itself may be n-alkyl, branched (iso) or optically active alkyl. For example $R^1$ and/or $R^2$ may have a structure

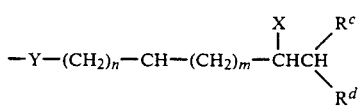

where n is 0 to 5, X is halogen Y is a single bond, COO or OOC, m is 0 to 5 and $R^c$ and $R^d$ may be the same or different and are $C_{1-5}$ n-alkyl groups. If $R^c$ and $R^d$ are different then the carbon atom to which they are attached will be assymmetric. Preferably n is 0.

Preferably A and B are independently either a single bond or a single unsubstituted 1,4-phenyl ring. It is particularly preferred for at least one of A and B to be a single bond.

Preferred halogens from which the substituents on the phenyl rings may be selected are fluorine and chlorine, especially fluorine.

Preferably the compound of Formula 1 contains no more than 4, or better, 3, rings (the central naphthyl system being counted as 2).

Some particularly preferred structural forms encompassed by Formula I are listed in Table 1 below.

TABLE 1

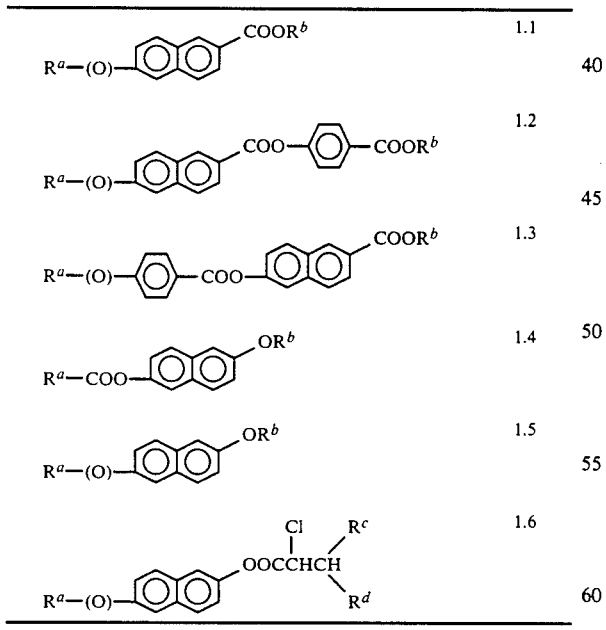

In table 1, $R^a$ denotes n-alkyl, —(O)— indicates that an oxygen atom may be present i.e. in an alkoxy group $R^a$—O—, $R^b$ denotes optically active alkyl and $R^c$ and $R^d$ denote the same or different $C_{1-5}$ n-alkyl groups.

Some other examples of useful groups from which A and B may be selected are listed in table 2 below:

TABLE 2

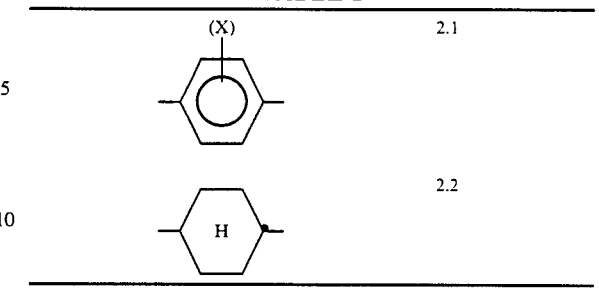

Where (X) indicates that one or more halogen substituents which may be the same or different may be present on the ring.

Figure 2:
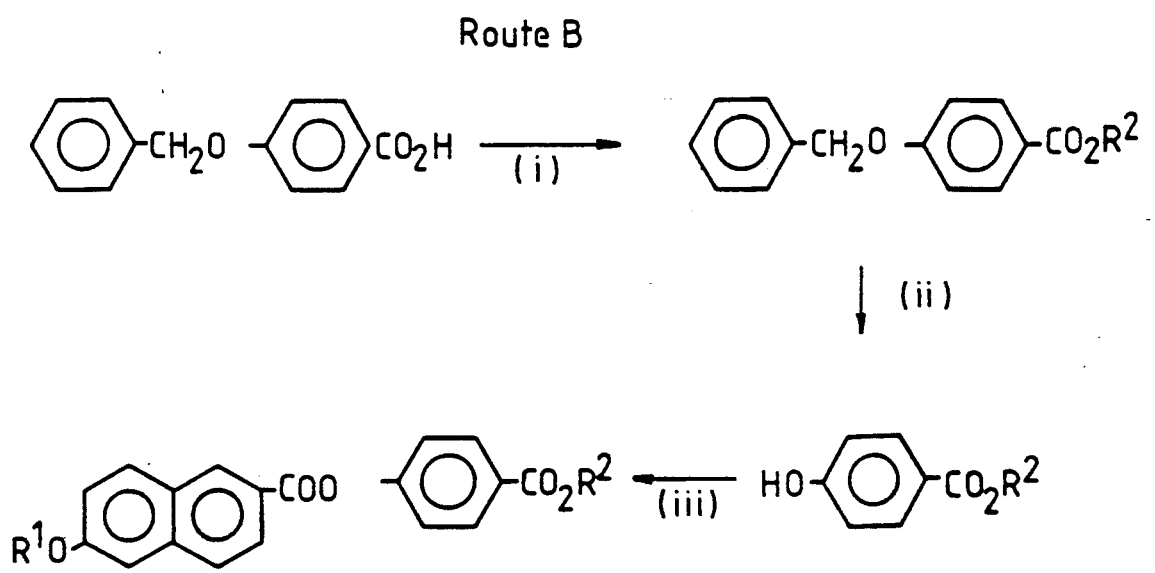
Figure 3:
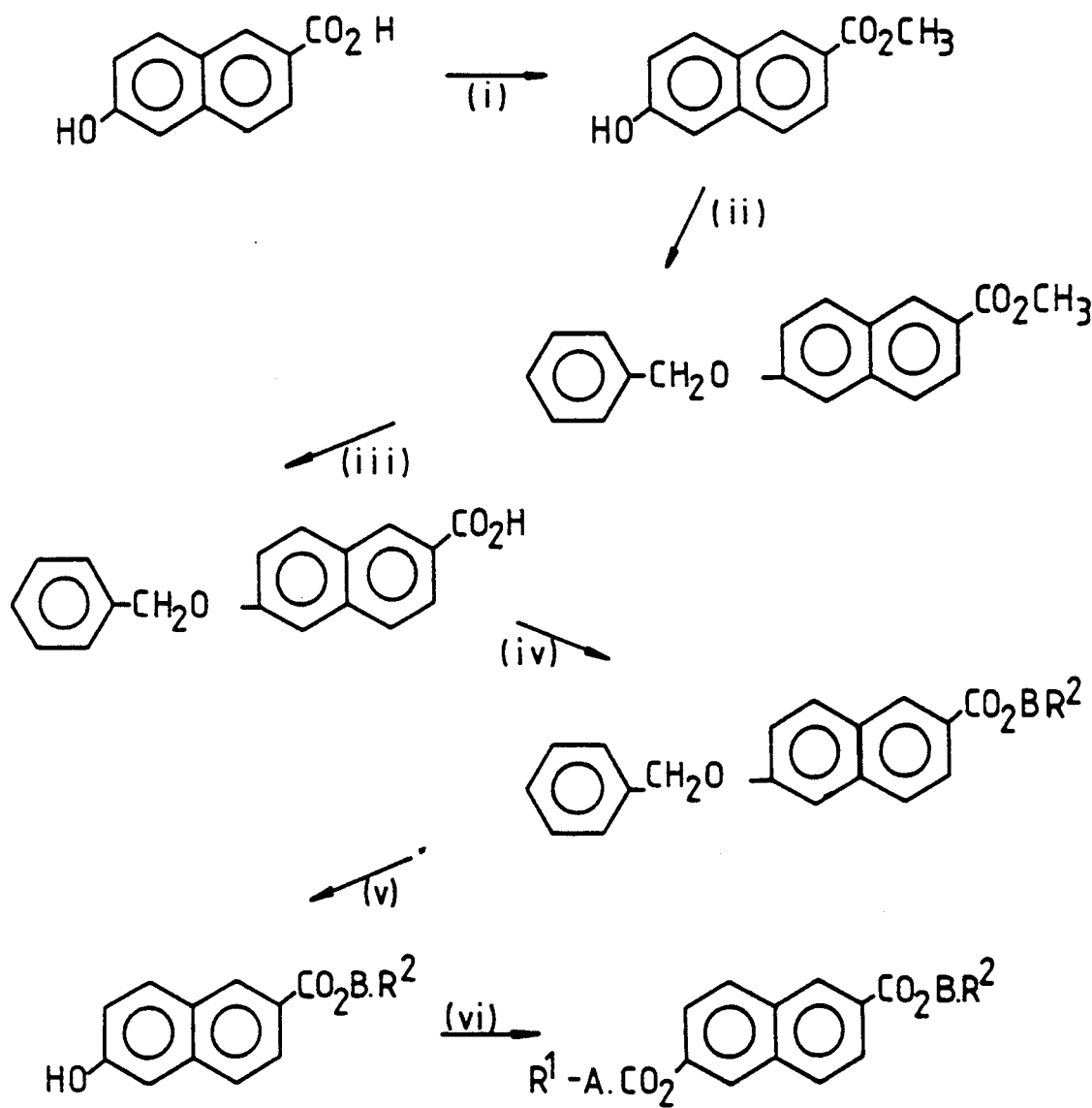

Some general routes for the preparation of compounds of Formula I are Routes A, B and C shown in FIGS. 1, 2 and 3, the steps of which are identified below:

Route A
(i) $R^1Br$, KOH, $C_2H_5OH$, $H_2O$.
(ii) $SOCl_2$; HO—B—$R^2$, solvent (eg toluene, $CH_2Cl_2$), base (eg pyridine, triethylamine).

Route B
(i) $SOCl_2$; $R^2OH$, Toluene, pyridine.
(ii) $PdC/H_2$.

(iii) 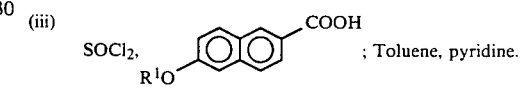 ; Toluene, pyridine.

Route C
(i) $CH_3OH$, $H_2SO_4$
(ii) Benzyl Chloride, $K_2CO_3$, Butanone
(iii) KOH, $C_2H_5OH$, $H_2O$
(iv) Thionyl Chloride; HO—B—$R^2$
(v) Pd/C, $H_2$, $C_2H_5OH$
(vi) $R^1$—A—$CO_2H$, $SOCl_2$; Toluene, pyridine.

Route D

Compounds in which $Z^1$ and/or $Z^2$ are —COO— or —OOC— respectively are simply esters of hydroxynaphthalene compounds and may be prepared by well known esterification reactions. Similarly those in which $Z^1$ and/or $Z^2$ are —O— are simply ethers and may be prepared via well known etherification reactions. A suitable starting point is 2,6-dihydroxynaphthalene.

By using a suitable alcohol or suitably substituted phenol, cyclohexanol or naphthol, i.e. HO—B—$R^2$ to esterify with the naphthoic acid chloride produced as an intermediate in step A(ii) any of the combinations —B—$R^2$ may be introduced into the molecule.

Some examples of suitable phenols and cyclohexanols are listed below:

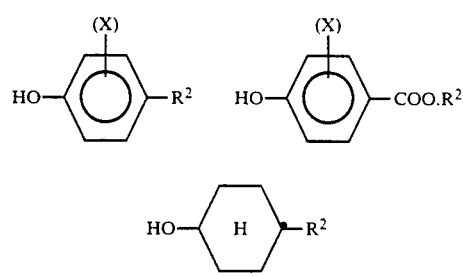

where (X) indicates that one or more halogen substituents, which may be the same or different, may be present on the ring.

In Route B, by sing appropriately substituted benzoyloxy-acids in step B(i) instead of benzoyloxybenzoic acid, other combinations of —B—$R^2$ may be introduced into the molecule.

In Route C, by using in step C(iv) appropriately substituted phenols, cyclohexanols or naphthols in a manner analogous to that discussed in relation to Route A, the various combinations of —B—$R^2$ may be introduced into the molecule. By using an appropriate carboxylic acid in step C(vi) the variour combinations of $R^1$—A— in which n is 1 may be introduced into the molecule. Some examples of suitable carboxylic acids are listed below:

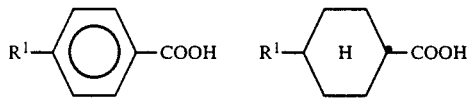

For use as a chiral dopant in a ferroelectric smectic liquid crystal mixture the compound of Formula I may have a chiral centre in either or both of $R^1$ and $R^2$. When present in only one of $R^1$ or $R^2$ the chiral centre may have the S or R configuration and may confer (+) or (−) senses of optical rotation on the molecule (configurations and senses of rotation need not correspond). When both $R^1$ and $R^2$ contain a chiral centre the configurations of the chiral senses and the senses of optical rotation may be the same or different. If it is preferred that the sense of Ps induced in a mixture by each chiral centre, if two are present in the molecule is the same so that a high Ps is induced. Advantageously the two chiral centres may induce opposing senses of helical twist in the chiral smectic phase, but the same sense of Ps, so that a material with a long, preferably infinite pitch may be obtained, with a high Ps.

The invention also provides a ferroelectric smectic liquid crystal composition containing at least two compounds, at least one of which is an optically active compound which contains at least one asymmetrically substituted carbon atom and has a formula IA:

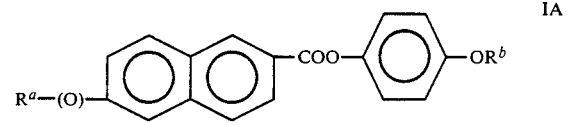

where $R^a$ is n-alkyl, (O) indicates that an oxygen atom may be present and $R^b$ represents optically active alkyl.

Compounds of formulae I and IA may be used as chiral dopants in a wide range of tilted smectic hosts. Some examples of suitable known hosts are the compounds listed in table 3 below, or mixtures of them.

TABLE 3

| | | |
|---|---|---|
| racemic | $R^A$—⟨⟩—⟨⟩—COO—⟨⟩—COOCH$_2$CH(CH$_3$)C$_2$H$_5$ | 3.1 |
| racemic | $R^A$—⟨⟩—⟨⟩—COO—⟨⟩—CH$_2$CH(CH$_3$)C$_2$H$_5$ | 3.2 |
| | $R^A$—⟨⟩—COO—⟨⟩—COO—⟨⟩(F)—$R^B$ | 3.3 |
| | $R^A$—⟨⟩—COO—⟨⟩—$R^B$ | 3.4 |

Where $R^A$ and $R^B$ may be $C_{1-12}$ n-alkyl or n-alkoxy, e.g. $R^A$=n-$C_3H_{17}$ or n-$C_3H_{17}O$ and $R^B$=n-$C_5H_{11}$.

A particularly preferred series of compounds for use as or in a tilted smectic host is the series of esters described in copending patent application PCT/GB86/0040, the contents of which are included herein by reference. These esters have the general formula

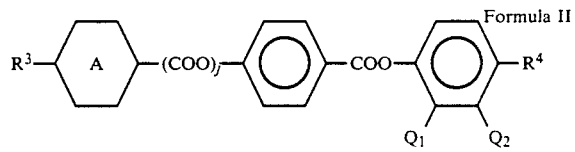

Formula II where

represents 1,4-phenyl or trans-1,4-cyclohexyl, $R^3$ represents $C_{3-12}$ alkyl, alkoxy, alkylcarbonyloxy, alkoxycarbonyl, or alkoxycarbonyloxy, j is 0 or 1, $R^4$ represents $C_{3-12}$ alkyl or alkoxy, one of $Q_1$ or $Q_2$ is H and the other F. Especially preferred esters of Formula II for use in or as a host together with a compound of Formula I as dopant are those below, where $R^5$ is $C_{3-12}$ alkyl or alkoxy:

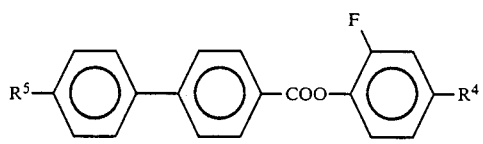

II.1

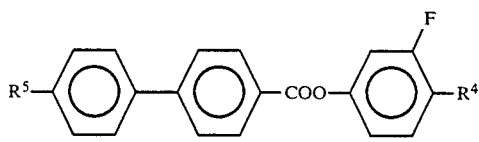

II.2

Another preferred class of smectic hosts are the phenyl-pyrimidines of general formula III below

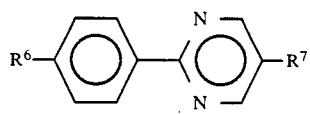

III where $R^6$ and $R^7$ are independently n-alkyl or n-alkoxy containing 1–12 carbon atoms, especially where $R^6$ is n-alkoxy containing 5–10 carbon atoms and $R^7$ is n-alkoxy containing 5–10 carbon atoms.

Some compounds of Formula I have the unexpected property that although they do not show smectic phases themselves, they are compatible with a wide range of smectic hosts, and do not depress (i.e. lower the temperature at which the smectic phase disappears) the smectic phase of the mixture to a significant extent.

This is unusual. Previously chiral dopants have been preferred which show a smectic phase themselves, which to some extent promises miscibility and compatibility with the smectic liquid crystal lattice of a host, without the suppression or depression which would be likely if a dopant incompatible with a smectic lattice were used. This suggests that the compounds of Formula I are members of a structural family which is exceptionally smectogenic.

This effect is manifested in mixtures of compounds of Formula I and the esters of Formula II, and as many of such mixtures show room temperature ferroelectric smectic phases, the compounds of Formula I and mixtures containing them are likely to be commercially important.

Ferroelectric smectic liquid crystal mixtures containing a compound of Formula I may also contain one or more other optically active compounds, and such other compounds may induce the same or the opposite sense of helical pitch on the chiral smectic phase of the mixture. If the latter, then a mixture may be obtained in some cases which has an infinite pitch, and if the senses of Ps induced by the compound of Formula I and such other compound(s) are additive, i.e. the same, then the mixture may also have a large Ps. Some examples of other known types of optically active compounds which can be used in this way with a compound of Formula I are listed in Table 4 below.

TABLE 4

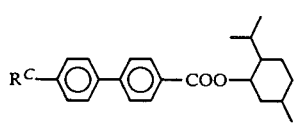

4.1

TABLE 4-continued

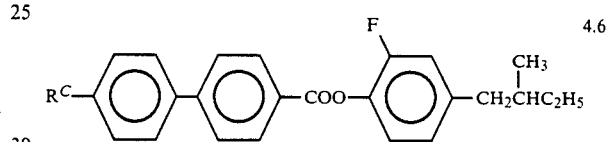

Where $R^C$ may be n-alkyl or n-alkoxy, and $R^D$ may be n-alkyl, or n-alkoxy if not present as —$COOR^D$, and $R^E$ is optically active alkyl. $R^C$, $R^D$ and $R^E$ independently contain 1 to 12 carbon atoms. A preferred form of structure 4.5 is 4.6 below:

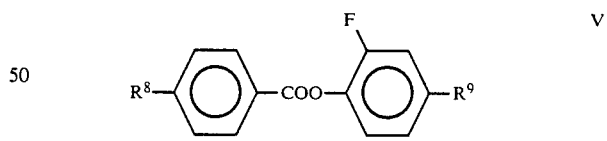

When the mixture contains compounds of Formula II, the inclusion of one or more optically active compounds of Formula IV.6 is preferred.

In addition to a compound of Formula I, a host material, and any other optically active compound(s) which may be present, a ferroelectric smectic liquid crystal material may also contain other known additives to modify or improve its properties if this is considered necessary, such as viscosity, liquid crystal transition temperatures, birefringence etc, or to suppress undesirable smectic phases.

Some examples of compounds which may be used as additives in this way are compounds of general structure V below

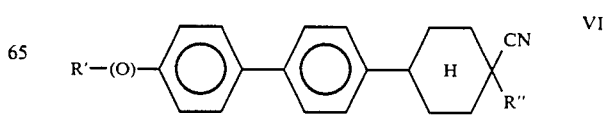

where $R^8$ and $R^9$ are independently n-alkyl or alkoxy containing 1 to 12 carbon atoms, especially 5 to 9. Additives of this structure are useful when the mixture contains compounds of Formula II.

When the mixture contains phenylpyrimidines of Formula III, r-1-cyano-cis-4-(4'-alkyl or alkoxy biphenyl-4-yl)-1-alkylcyclohexanes i.e. compounds of structure VI below:

where R' and R" are the same or different alkyl groups especially containing 3 to 10 carbon atoms are useful additives.

A typical ferroelectric smectic liquid crystal mixture which incorporates one or more compounds of Formula I has the following composition:

| | |
|---|---|
| Host, eg Table 3 compound, ether of Formula II, or mixtures thereof. | up to 99 wt % |
| One or more compounds of Formula I | up to 50 wt % (perferable 1 to 30 wt %) |
| Other optically active compound, eg Table 4 compound | up to 40 wt % |
| Additives to modify properties The total being 100% | up to 50 wt % |

The actual composition selected will depend upon the properties required. Ps is generally proportional to the amount of chiral dopants present in the mixture, and it is desirable to achieve as high a Ps as possible without compromise of other desirable properties.

Ferroelectric smectic liquid crystal materials incorporating a compound of Formula I may be used in any of the known types of electro-optic device which use such materials, for example as generally described in Appl. Phys. Lett. 36, (1980) p 899. (Reference 1).

An example of such a device is the "Clark Lagerwall Device", described in Reference 1, and also in "Recent Developments in Condensed Matter Physics" 4, p309, (1981) (Reference 3). The physics of this device, and methods of constructing one are well known. In practice such a device usually consists of two substrates, at least one of which is optically transparent, electrodes on the inner surfaces of the substrates and a layer of the liquid crystal material sandwiched between the substrates.

The Clark Lagerwall device uses a layer of liquid crystal material between the substrates of a thickness comparable to or less than the helical pitch of the S* configuration, which causes the helix to be unwound by surface interactions. In its unwound state the material has two surface stabilised states with director orientations (i.e. molecular tilt direction) at twice the tilt angle to one another, and also permanent dipole orientations perpendicular to the substrates but in opposite directions.

An alternative approach to providing cells for a Clark Lagerwall device having a thicker layer of liquid crystal material is to use an applied electric field to induce homogeneous alignment through interaction with the dielectric anistropy of the liquid crystal material.

According therefore to a further aspect of this invention there is provided a liquid crystal electro-optic display device wherein the liquid crystal material incorporates a compound of formula I, and may be a material as described herein. The device may be a Clark Lagerwall device as described above.

In this description the following symbols and abbreviations are used:

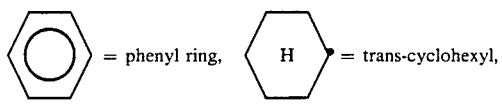

$[\alpha]_D^t$ = optical rotation at t° C. using sodium D line,
tlc = thin layer chromatography,
glc = gas liquid chromatography
hplc = high pressure liquid chromatography
DSC = differential scanning calorimetry
K = solid crystal (with reference to liquid crystal transitions)
N = nematic
Ch = cholesteric (chiral nematic)
S = smectic all temperatures are in °C.
mpt = melting point.
I = isotropic liquid.

The invention will now be described by way of example only with reference to the following examples.

In the preparative examples described below, DCC is dicyclohexylcarbodiimide, DMAP is 4-N,N'-dimethylaminopyridine.

EXAMPLE 1

(Route A)

S(+)-1-Methylheptyl 6-n-octoxynaphthalene-2-carboxylate

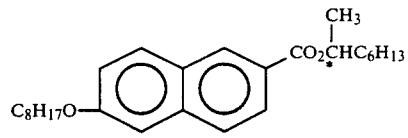

Step A(i)

6-n-Octoxynaphthalene-2-carboxylic acid

6-Hydroxynaphthalene-2-carboxylic acid (39.8 g), 1-bromooctane (61.3 g), potassium hydroxide (23.7 g), ethanol (900 ml) and water (120 ml) were stirred and refluxed for 16 hours. 10% Aqueous potassium hydroxide (200 ml) was added and refluxing was continued for a further 2 hours, when the solution was poured into water (5 liter) and acidified to ph 1. The solid was filtered, washed with water, dried and recrystallised from acetic acid to give the product (49.0 g, 77.2% theory) as a white crystalline solid, mpt 150°-153° C. (98.2% pure by hplc).

Step A(ii)

S(+)-1-Methylheptyl 6-n-octoxynaphthalene-2-carboxylate

The foregoing acid (8.5 g) was refluxed with thionyl chloride (30 ml) for 75 minutes when the excess thionyl chloride was evaporated off and the crude acid chloride dried at 0.1 mbar pressure for 1 hour at 60° C. It was dissolved in toluene (45 ml) and added to a solution of S(+)-2-octanol (4.4 g) in pyridine (20 ml). After heating at 90° for 3½ hours, the mixture was allowed to cool to room temperature overnight and then acidified to pH 1 with 6N hydrochloric acid. The organic phase was washed with water (50 ml), 2% sodium hydroxide solution (50 ml) and water (50 ml). Evaporation of the solvent left a brown residue which was recrystallised twice from ethanol containing a drop of pyridine at −15° C. to give a white solid (6.2 g). This was chromatographed over alumina (20 g) in a mixture (2:1) of petroleum spirit (bp 60°–80°) and dichloromethane to give the product (5.9 g, 50.9% theory), mpt 26.6°–26.8°, $[\alpha]_D$ +37.7 (in CHCl$_3$ (purity 99.3% by glc, 99.0% by DSC).

EXAMPLE 2

(Route B)

S(+)-1-Methylheptyl 4-(6-n-octyloxy-2-naphthoyloxy)-benzoate

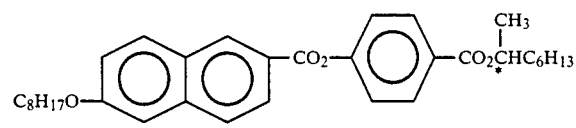

Step B(i)

S(+)-1-Methylheptyl 4-benzyloxybenzoate

4-Benzyloxybenzoic acid (55 g) was converted to the acid chloride with thionyl chloride (120 ml) as described in example 1, and then reacted with S(+)-2-octanol (31.4 g) in pyridine (150 ml) and toluene (250 ml). The crude, yellow liquid product (80.7 g) was adsorbed on a mixture of alumina (240 g) and silica gel (240 g) from petroleum spirit (60°–80°) and eluted with a 1:1 mixture of petrol and dichloromethane. The product was obtained as a colourless oil (70.0 g, 85.3% yield).

Step B(ii)

S(+)-1-Methylheptyl 4-hydroxybenzoate

The foregoing ether (69.3 g) in ethanol (900 ml) was hydrogenated over 5% palladium on charcoal at 40° C. until uptake of hydrogen ceased. The catalyst was filtered and the solvent evaporated to give the product as a brown oil (51.0 g, 100% theory) (99.5% pure by glc) showing strong —OH absorption in the infrared at 3350 cm$^{-1}$.

Step B(iii)

S(+)-1-Methylheptyl 4-(6-n-octyloxy-2-naphthoyloxy)-benzoate 6-n-Octyloxy-2-naphthoic acid (24 g) was reacted with thionyl chloride (60 ml) as described previously and the crude acid chloride in toluene (100 ml) was added to a solution of S(+)-2-octanol (20 g) in pyridine (80 ml) dropwise over 10 minutes. After heating at 90° C. for 3 hours, the diester was isolated by acidification etc. It was purified by chromatography over silica gel in petrol and finally by 2 recrystallisations from propan-2-ol, and obtained as a white crystalline solid (14.5 g, 34% theory), K-I, 69°–69.3° (S$_A$-I 62.1°), $[\alpha]_D$ +22.4 99.9% pure by hplc.

EXAMPLE 3

(Route C)

S(+)-1-Methyl heptyl 6-(4-n-octyloxybenzoyloxy)-2-naphthoate.

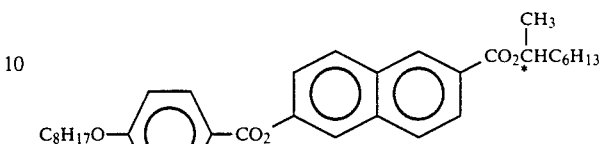

Step C(i)

Methyl 6-hydroxy-2-naphthoate

6-Hydroxy-2-naphthoic acid (60 g), methanol (240 ml) and sulphuric acid (12 ml) were refluxed together for 5 hours. The ester was isolated by pouring into water and recrystallised from methanol (50.0 g, 77.5% theory)

Step C(ii)

Methyl 6-benzyloxy-2-naphthoate

Methyl 6-hydroxy-2-naphthoate (50 g), benzyl chloride (31.3 g), anhydrous potassium carbonate (100 g) and 2-butanone (350 ml) were stirred and refluxed together for 17 hours. Tlc showed the presence of some unreacted starting material and so a further 5 g benzyl chloride was added and refluxing continued for 3 hours. The product was isolated by pouring into water (1 liter), extracting the aqueous layer with 3×600 ml and 2×350 ml 2-butanone, followed by evaporation to dryness. The residue (65.7 g brown solid) was chromatographed over alumina (330 g) and silica gel (130 g) in dichloromethane, and the product was recrystallised from ethyl acetate (350 ml). Yield 37.3 g (51.6% theory) mpt 148.4°–149.3° C.

Step C(iii)

6-Benzyloxy-2-naphthoic acid

The ester from C(ii) (37.2 g), potassium hydroxide (19.0 g) ethanol (250 ml) and water (50 ml) were refluxed together for 2 hours. On pouring into 10% hydrochloric acid (800 ml) the acid separated as a white solid which was filtered, washed and dried. Yield 34.7 g (97.2% theory). Tlc showed only one spot.

Step C(iv)

S(+)-1-Methylheptyl 6-benzyloxy-2-naphthoate

6-Benzyloxy-2-naphthoic acid (34.7 g) was converted to the acid chloride with thionyl chloride (150 ml) and the crude product (37.0 g) was reacted with S(+)-2-octanol (16.2 g) in toluene (120 ml) and pyridine (65 ml). The crude product was chromatographed over alumina (150 g) and silica gel (150 g) in a 2:1 - mixture of petroleum spirit (60°–80°) and dichloromethane and eluted with dichloromethane. The naphthoate was obtained as a white solid (38.0 g, 76% theory) mpt 71°–73°, 99.6% pure by glc.

Step C(v)

S(+) 1-Methylheptyl 6-hydroxy-2-naphthoate

The benzyl ether of C(iv) (36.7 g), in ethanol (475 ml) was hydrogenated over 5% palladium charcoal at 45° C. for 4 hours. The product, isolated by filtration and evaporation (27.8 g, 98.6%) showed a strong —OH band in the IR spectrum at 3380 cm$^{-1}$.

Step C(vi)

S(+)-1-Methylheptyl 6-(4-n-octyloxybenzoyloxy)-2-naphthoate 4-n-Octoxybenzoic acid (21.7 g) was converted to the acid chloride with thionyl chloride (50 ml) and reacted with the product of C(v), (26.0 g) in toluene (100 ml) and pyridine (100 ml) as described in the previous examples. The crude product was chromatographed over silica gel (150 g) in dichloromethane to give an off-white product (33.3 g). This was recrystallised from ethyl acetate (150 ml) at $-20°$ C. and recovered as a white crystalline solid (19.7 g, 42.6% theory). K 53.8, S$_A$ 66.2I, 99.6% pure by hplc, $[\alpha]_D$ +28.6.

EXAMPLE 4

(Route A)

R(—)-1-Methylheptyloxyphenyl 6-n-octoxynaphthalene-2-carboxylate

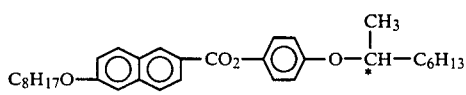

Step 1

S-1-Methylheptyl toluenesulphonate

Toluene-4-sulphonyl chloride (44 g) was dissolved in pyridine (300 mls). This solution was added to a solution of S-1-methylheptanol (30 g) in pyridine (300 mls) over 15 minutes at room temperature, and the resulting mixture was stirred for 16 hours at room temperature. After this period, it was added to ice (500 g), water (500 mls), and concentrated hydrochloric acid (600 mls). The mixture was stirred for 5 minutes, then the product extracted with dichloromethane (3×500 mls) and the extracts washed with water (2×300 mls). Removal of the solvent by distillation yielded the product as a light yellow oil, $[\alpha]_D^{20} = +5.8$. The yield was 52.8 g (80.6%) of purity 99.3% by hplc.

Step 2

R-1-Methylheptyl 4-benzyloxyphenyl ether

S-1-Methylheptyl toluenesulphonate (52.5 g), 4-benzyloxyphenol (37 g), anhydrous potassium carbonate (37 g) and butanone (330 mls) were stirred together and boiled under reflux for 43 hours. The mixture was added to water (240 mls) and stirred for 1 hour, then the product was extracted in petroleum ether (bp 60°-80°; 3×300 mls). The extracts were washed with water (500 mls) dried over sodium sulphate, and removal of the solvent by distillation yielded the crude product (18.2 g). This was purified by chromatography on a column of silica gel and basic alumina, eluted with a 2:1 mixture of petroleum ether (bp 60°-80°) and dichloromethane. Evaporation of the solvent from combined fractions yielded the product as a yellow oil, yield 13.8 g (76%) purity 99.6% by hplc.

Step 3

R-1-Methylheptyloxyphenol

R-1-Methylheptyl 4-benzyloxyphenyl ether (59.5 g) was dissolved in industrial methylated spirit (820 mls) and 5% palladium charcoal (20 g) was added. The mixture was warmed to 40° C. and stirred under a hydrogen atmosphere for 2 hours, over which period 4.3 liters of hydrogen were absorbed. Filtration of the resulting solution and removal of the solvent by distillation provided the product as a yellow oil, yield 42.8 g (51%), purity 97.9% by hplc, which was used without further purification, $[\alpha]_D^{20} - 9.3°$

Step 4

R-1-Methylheptyloxyphenyl 6-n-octyloxynaphthalene-2-carboxylate 6-n-Octyloxynaphthalene-2-carbonylchloride was prepared from the acid (8 g) by the method described in Example 1, and added to a mixture of R-1-methylheptyloxyphenol (5.9 g), triethylamine (11.6 mls) and dichloromethane (116 mls). The mixture was boiled under reflux for 1 hour, cooled, and washed with water (100 mls), dilute hydrochloric acid (20%, 100 mls) and water (100 mls). Removal of the solvent by distillation gave the product as a yellow semi-solid. This was purified by chromatography on basic alumina eluted with a 2:1 mixture of petroleum ether (bp 60°-80°) and dichloromethane. Successive recrystallisations from butanone gave the purified product as a waxy solid, yield 4.5 g, having the transition temperatures K-S$_A$ 43°, S$_A$-I 66°.

The following Examples 5, 6, 7 and 8 all describe ferroelectric smectic liquid crystal mixtures containing the products of Examples 1, 2, 3 and 4 in hosts which are mixtures of esters of Formula II above. All the mixtures described show room temperature ferroelectric smetic liquid crystal phases.

The percentages referred to in Examples 5, 6, 7 and 8 are all weight percentages.

EXAMPLE 5

A mixture was made up of

| (Example 1) | |
| --- | --- |
| 45% w/w | 2-fluoro-4-n-pentylphenyl 4'-n-octylbiphenyl-4-carboxylate |
| 45% w/w | 2-fluoro-4-n-pentylphenyl 4'-n-octyloxybiphenyl-4-carboxylate |
| 10% w/w | S-(+)-1-methylheptyl 6-n-octyloxynaphthalene-2-carboxylate | and showed the following phase transitions: S$_C$-S$_A$ 55°; S$_A$-Ch 86°; Ch-I 126°-128°

The ferroelectric spontaneous polarisation of this mixture as a function of temperature was measured as follows:

| | |
| --- | --- |
| 20.4° C. | 5.3 nC/cm$^2$ |
| 25 | 5.2 nC/cm$^2$ |
| 30 | 5.1 nC/cm$^2$ |
| 35 | 4.7 nC/cm$^2$ |
| 40 | 4.2 nC/cm$^2$ |
| 45 | 3.5 nC/cm$^2$ |
| 50 | 2.5 nC/cm$^2$ |

| | |
|---|---|
| 55 | 0.7 nC/cm² |

EXAMPLE 6

A mixture was made up comprising:

| | (Example 2) |
|---|---|
| 30% | 2-fluoro-4-n-pentylphenyl 4'-n-octylbiphenyl-4-carboxylate |
| 30% | 2-fluoro-4-n-pentylphenyl 4'-n-octyloxybiphenyl-4-carboxylate |
| 30% | 2-fluoro-4-n-heptylphenyl 4'-n-heptyloxybiphenyl-4-carboxylate |
| 10% | S-(+)-1-Methylheptyl 4-(6-n-octyloxy-2-naphthoyloxy)-benzoate | and was found to show the following phase transitions: $S_C$-$S_A$ 74°; $S_A$-Ch 122°: Ch-I 146°–147°

The ferroelectric spontaneous polarisation was measured as a function of temperature:

| | |
|---|---|
| 30° C. | 5.3 nC/cm² |
| 40° | 4.7 nC/cm² |
| 50° | 4.0 nC/cm² |
| 60° | 3.0 nC/cm² |
| 65° | 2.4 nC/cm² |
| 70° | 1.4 nC/cm² |
| 73° | 0.3 nC/cm² |

EXAMPLE 7

A mixture was made up of

| | (Example 3) |
|---|---|
| 30% | 2-fluoro-4-n-pentylphenyl 4'-n-octylbiphenyl-4-carboxylate |
| 30% | 2-fluoro-4-n-pentylphenyl 4'-n-octyloxybiphenyl-4-carboxylate |
| 30% | 2-fluoro-4-n-heptylphenyl 4'-n-heptyloxybiphenyl-4-carboxylate |
| 10% | S-(+)-1-Methylheptyl 6-(4-n-octyloxybenzoyloxy)-2-naphthoate | and found to have the following phase transitions: $S_C$-$S_A$ 82°; $S_A$-Ch 117°; Ch-I 143°

The ferroelectric spontaneous polarisation of the mixture was measured as follows as a function of temperature:

| | |
|---|---|
| 21.8° C. | 6.0 nC/cm² |
| 30° | 5.9 nC/cm² |
| 40° | 5.4 nC/cm² |
| 50° | 5.0 nC/cm² |
| 60° | 4.5 nC/cm² |
| 70° | 3.8 nC/cm² |
| 75° | 3.2 nC/cm² |
| 80° | 2.8 nC/cm² |
| 85° | 1.5 nC/cm² |
| 88° | 0.2 nC/cm² |

EXAMPLE 8

A mixture was made up of

| | |
|---|---|
| 2-Fluoro-4-n-pentylphenyl 4'-n-octylbiphenyl-4-carboxylate | 30% |
| 2-Fluoro-4-n-pentylphenyl 4'-n-octyloxybiphenyl-4-carboxylate | 30% |
| 2-Fluoro-4-n-heptylphenyl 4'-n-heptyloxybiphenyl-4-carboxylate | 30% |
| (R)-1-Methylheptyloxyphenyl 6-n-octyloxynaphthalene-2-carboxylate | 10% | and found to have the following phase transitions: $S_C$-$S_A$ 95°; $S_A$-Ch 111°; Ch-I 145°

The ferroelectric spontaneous polarisation of the mixture was measured as a function of temperature as follows:

| | |
|---|---|
| 22° C. | 1.6 nC/cm² |
| 30° | 1.7 |
| 40° | 1.9 |
| 50° | 1.8 |
| 60° | 1.6 |
| 70° | 1.3 |
| 80° | 1.1 |
| 85° | 0.9 |
| 90° | 0.7 |
| 95° | 0 |

EXAMPLE 9

A mixture of 2-hydroxy-6-n-octyloxy naphthalene (5.3 g) (obtainable by etherification of 2,6-dihydroxy naphthalene with n-octanol (GB 2176188A), optically active 2-chloro-3-methylbutyric acid (1.9 g) and DMAP (1.7 g) were suspended in dichloromethane (40 ml).

DCC (3.1 g) in dichloromethane (5 ml) was then added dropwise at 0° C. and the mixture was stirred for 12 hours at room temperature. After separating off the dicyclohexylure and the usual working up, optically active 6-octyloxy-naphthyl-2-(2-chloro-3-methylbutyrate) was obtained, i.e.

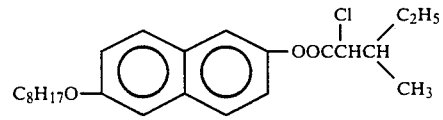

In an identical procedure, optically active 2-chloropropionic acid was used to yield the analogous

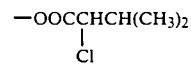

compound.

EXAMPLE 10

The product of example 9 was made up into a mixture consisting of:

| | |
|---|---|
| 3% | 2-p-hexyloxyphenyl-5-heptylpyrimidine |
| 3% | 2-p-heptyloxyphenyl-5-heptylpyrimidine |
| 3% | 2-p-octyloxyphenyl-5-heptylpyrimidine |
| 3% | 2-p-nonyloxyphenyl-5-heptylpyrimidine |
| 9% | 2-p-hexyloxyphenyl-5-nonylpyrimidine |
| 23% | 2-p-nonyloxyphenyl-5-nonylpyrimidine |
| 10% | r-1-cyano-cis-4-(4'-octyloxybiphenyl-4-yl)-1-butylcyclohexane |
| 20% | r-1-cyano-cis-4-(4'-octyloxybiphenyl-4-yl)-1-octylcyclohexane |
| 16% | r-1-cyano-cis-4-(4'-heptylbiphenyl-4-yl)-1-hexylcyclohexane |
| and | |
| 10% | optically acid 6-octyloxy-naphthyl-2-(2-chloro-3- |

-continued methylbutyrate)

exhibits a broad S*$_C$ range and a high spontaneous polarisation.

The products of examples 1 and 3 were made up into the mixtures of examples 11 and 12.

EXAMPLE 11

| | |
|---|---|
| 2-Fluoro-4-n-pentylphenyl 4'-n-octylbiphenyl-4-carboxylate | 17.7% |
| 2-Fluoro-4-n-pentylphenyl 4'-n-octyloxybiphenyl-4-carboxylate | 17.6% |
| 2-Fluoro-4-n-heptylphenyl 4'-n-heptyloxybiphenyl-4-carboxylate | 17.7% |
| (S)-2-Fluoro-4-(2-methylbutyl)phenyl 4'-n-octyloxybiphenyl-4-carboxylate | 18.1% |
| (S)-2-Fluoro-4-(2-methylbutyl)phenyl 4'-n-heptylbiphenyl-4-carboxylate | 8.9% |
| (S)-2-methylheptyl 6-n-octyloxynaphthalene-2-carboxylate | 3.3% |
| (S)-2-methylheptyl 6-(4-n-octyloxybenzenecarbonyloxy)-naphthalene-2-carboxylate | 6.7% |
| 2-Fluoro-4-n-pentylphenyl 4'-n-octyloxybenzoate | 10.0% |

The following phase transition temperatures were measured on the above mixture: S$_C$-S$_A$ 57° C.; S$_A$'-N* 8° C.; N*-I 122°–124°

The variation of spontaneous polarisation and tilt angle with temperature in the above mixture are tabulated below:

| Temperature (°C.) | Spontaneous polarisation (nC/cm$^2$) | Tilt Angle (degrees) |
|---|---|---|
| 0 | 7.5 | 24° |
| 10 | 6.8 | 24° |
| 20 | 6.1 | 23° |
| 30 | 5.4 | 21° |
| 40 | 4.7 | 19° |
| 50 | 3.3 | 16° |
| 55 | 2.2 | 10° |

EXAMPLE 12

| | |
|---|---|
| 2-Fluoro-4-n-pentylphenyl 4'-n-octylbiphenyl-4-carboxylate | 21% |
| 2-Fluoro-4-n-pentylphenyl 4'-n-octyloxybiphenyl-4-carboxylate | 21% |
| 2-Fluoro-4-n-heptylphenyl 4'-n-heptyloxybiphenyl-4-carboxylate | 21% |
| (S)-2-Fluoro-4-(2-methylbutyl)phenyl 4'-n-octyloxybiphenyl-4-carboxylate | 18.1% |
| (S)-2-Fluoro-4-(2-methylbutyl)phenyl 4'-n-heptylbiphenyl-4-carboxylate | 8.9% |
| (S)-2-methylheptyl 6-n-octyloxynaphthalene-2-carboxylate | 3.3% |
| (S)-2-methylheptyl 6-(4-n-octyloxybenzenecarbonyloxy)-naphthalene-2-carboxylate | 6.7% |

The mixture showed the following phase transition temperatures: S$_C$-S$_A$ 74° C.; S$_A$-N* 105° C.; N*-I 136° C. The spontaneous polarisation of the material and its tilt angle were measured as a function of temperature, and the results are tabulated below:

| Temperature (°C.) | Spontaneous polarisation (nC/cm$^2$) | Tilt angle (degrees) |
|---|---|---|
| 0 | 11.1 | 26 |
| 10 | 9.1 | 26 |
| 20 | 8.4 | 25 |
| 30 | 8.0 | 24 |
| 40 | 6.8 | 22 |
| 50 | 5.9 | 20 |
| 60 | 4.3 | 17 |
| 70 | 2.3 | 9 |

An example of the use of a compound of Formula I in a liquid crystal material and device embodying the present invention will now be described with reference to FIG. 4.

Figure 4:
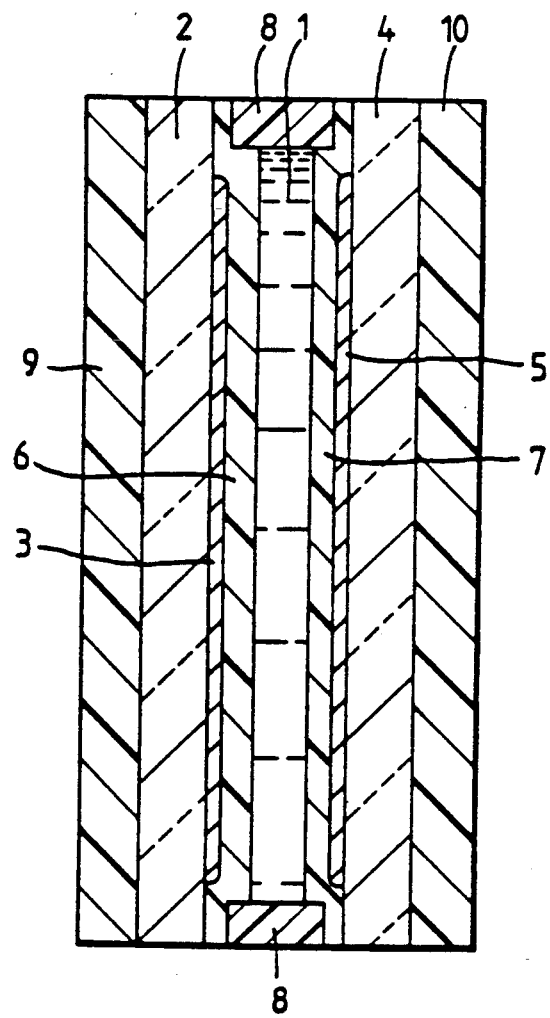
FIG. 4 shows a cross-section through a liquid crystal device.

In FIG. 4 a liquid crystal cell comprises a layer 1 of liquid crystal material exhibiting a chiral smectic phase sandwiched between a glass slide 2 having a transparent conducting layer 3 on its surface, e.g. of tin oxide or indium oxide, and a glass slide 4 having a transparent conducting layer 5 on its surface. The slides 2,4 bearing the layers 3,5 are respectively coated by films 6,7 of a polyimide polymer. Prior to construction of the cell the films 6 and 7 are rubbed with a soft tissue in a given direction the rubbing directions being arranged parallel upon construction of the cell. A spacer 8 e.g. of polymethyl methacrylate, separates the slides 2,4 to the required distance, e.g. 5 microns. The liquid crystals material 1 is introduced between the slides 2,4 to the required distance, e.g. 5 microns. The liquid crystal material 1 is introduced between the slides 2,4 by filling the space between the slides 2,4 and spacer 8 and sealing the spacer 8 in a vacuum in a known way. Preferably the liquid crystal material is in the smectic A, nematic or isotropic liquid phase (obtained by heating the material) when it is introduced between the slides 2,4 to facilitate alignment of the liquid crystal molecules with the rubbing directions on the slides 2,4.

A polarizer 9 is arranged with its polarization axis parallel to the rubbing direction on the films 6,7 and an analyzer (crossed polarizer) 10 is arranged with its polarization axis perpendicular to that rubbing direction.

When a square wave voltage (from a conventional source not shown) varying between about +10 volts and −10 volts is applied across the cell by making contact with the layers 3 and 5 the cell is rapidly switched upon the change in sign of the voltage between a dark state and a light state as explained above.

In an alternative device (not shown) based on the cell construction shown in FIG. 4 the layers 3 and 5 may be selectively shaped in a known way, e.g. by photoetching or deposition through a mask, e.g. to provide one or more display symbols, e.g. letters, numerals, words or graphics and the like as conventionally seen on displays. The electrode portions formed thereby may be addressed in a variety of ways which include multiplexed operation.

The layer of liquid crystal material 1 in FIG. 4 may for example be the mixture of Examples 5, 6, 7, 8, 10, 11 or 12.

We claim:

1. An optically active naphthlene compound having the formula:

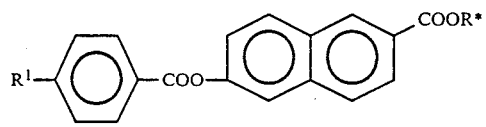

where $R^1$ is $C_{1-10}$ alkyl or alkoxy and $R^*$ is $C_{4-16}$ optically active alkyl.

2. The compound according to claim 1, wherein $R^1$ is $C_{6-10}$ n-alkoxy.

3. The compound according to claim 1 or 2, wherein $R^*$ is an optically active 1-methylalkyl group.

4. The compound according to claim 3, wherein $R^*$ is 1-methylheptyl.

5. The compound according to claim 3, wherein $R^1$ is n-octyloxy.

6. A ferroelectric smectic liquid crystal composition containing at least two compounds, at least one of said compounds being a compound as claimed in claim 1.

7. A ferroelectric smectic liquid crystal composition containing at least two compounds, at least one of which is a compound as claimed in claim 2.

8. A ferroelectric smectic liquid crystal composition containing at least two compounds, at least one of said compounds being a compound as claimed in claim 3.

9. A ferroelectric smectic liquid crystal composition containing at least two compounds, at least one of said compounds being a compound as claimed in claim 4.

10. A ferroelectric smectic liquid crystal composition containing at least two compounds, at least one of said compounds being a compound as claimed in claim 5.

11. A ferroelectric smectic liquid crystal composition according to any one of claims 6–10, which additionally contains at least one compound selected from the group consisting of formulae 11.1, 11.2, and III:

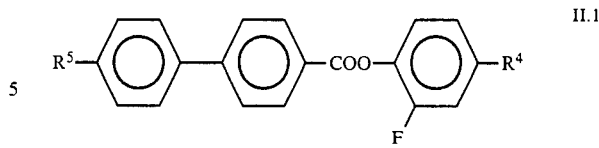

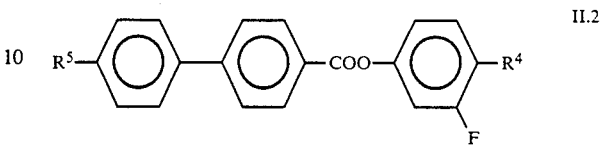

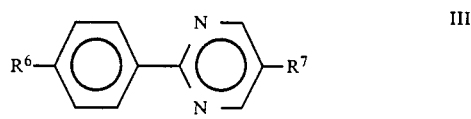

where $R^4$ and $R^5$ independently represent $C_{3-12}$ alkyl or alkoxy and $R^6$ and $R^7$ independently represent $C_{1-12}$ alkyl or alkoxy.

12. A liquid crystal electro-optic display device which consists of two substrates, at least one of which is optically transparent, having electrodes on the inner surface of the substrates and a layer of a liquid crystal material sandwiched between the substrates, wherein the liquid crystal material is a composition as claimed in any one of claims 6–10.

13. A liquid crystal electro-optic display device which consists of two substrates, at least one of which is optically transparent, having electrodes on the inner surface of the substrates and a layer of a liquid crystal material sandwiched between the substrates, wherein the liquid crystal material is a composition as claimed in claim 11.

* * * * *